July 28, 1964  E. J. ROTH  3,142,398
APPARATUS FOR REMOVING ARTICLES FROM WIRE BAKERY SCREENS
Filed Oct. 19, 1962  4 Sheets-Sheet 1

INVENTOR.
ERNEST J. ROTH
BY
ATTORNEY

July 28, 1964

E. J. ROTH 3,142,398

APPARATUS FOR REMOVING ARTICLES FROM WIRE BAKERY SCREENS

Filed Oct. 19, 1962

INVENTOR.
ERNEST J. ROTH

BY

ATTORNEY

July 28, 1964  E. J. ROTH  3,142,398
APPARATUS FOR REMOVING ARTICLES FROM WIRE BAKERY SCREENS
Filed Oct. 19, 1962  4 Sheets-Sheet 3

INVENTOR.
ERNEST J. ROTH
BY Richard J. Cowling
ATTORNEY

July 28, 1964 E. J. ROTH 3,142,398
APPARATUS FOR REMOVING ARTICLES FROM WIRE BAKERY SCREENS
Filed Oct. 19, 1962 4 Sheets-Sheet 4

INVENTOR.
ERNEST J. ROTH
BY
ATTORNEY

United States Patent Office 3,142,398
Patented July 28, 1964

3,142,398
APPARATUS FOR REMOVING ARTICLES FROM WIRE BAKERY SCREENS
Ernest J. Roth, Reno, Nev., assignor to Joe Lowe Corporation, New York, N.Y., a corporation of Delaware
Filed Oct. 19, 1962, Ser. No. 231,709
2 Claims. (Cl. 214—310)

The present invention relates generally to an article transferring apparatus, and it has specific relation to a machine which is capable of removing fragile cooked or uncooked bakery articles, such as buns, rolls or doughnuts, from a conventional wire bakery screen without turning or tilting the screen to dump them therefrom.

Heretofore, it has been the standard practice in the baking industry to place bakery products, such as buns, rolls or doughnuts onto conventional wire bakery screens, whereupon a number of such articles may be transported from one operation to another without individual handling. However, when the time came to remove the articles from such wire screens, it was the customary practice to turn or tilt the screen, causing the articles to fall off onto a table, conveyor or other supporting surface. This operation was very hard on the fragile proofed, freshly baked and/or fried articles, causing frequent damage in the form of indentations, breakage, etc. sufficient to render such articles commercially unsaleable.

With the present invention these disadvantages have been obviated, and it is now possible to remove such freshly proofed, baked and/or fried articles from their conventional wire bakery screens in a simple, easy, effortless manner which places no strains, shocks, bumps or indentations on the articles, and which does not change their orientation or spacing arrangement in any way whatsoever while at the same time making the transfer at the same rate of speed in which the bakery screens are being moved there into and therethrough.

An object of the present invention is to provide a simple, efficient, durable and economical machine for transferring newly proofed, newly baked or newly fried bakery articles from a conventional wire bakery screen to a delivery conveyor.

A further object of the invention is the provision of a simple, inexpensive and durable machine by which conventional wire bakery screens, loaded with freshly proofed, baked and/or fried articles, can be unloaded without turning, tilting or dumping the articles therefrom.

Another object of the invention is to provide a simple, efficient and automatic apparatus which can be used in combination with other machines and/or conveyors without changing and/or effecting their operations, to unload a continuous line of wire bakery screens and position such released articles on a delivery conveyor without requiring the attendance and/or assistance of an operator.

Other and further objects and advantages of the invention reside in the detailed construction of the several parts, which result in simplicity, economy and efficiency, and which will be apparent from the following description, wherein a preferred embodiment of the invention is shown, reference being had to the accompanying drawings, forming a part hereof, wherein like numerals indicate like parts, in which.

Figure 1:
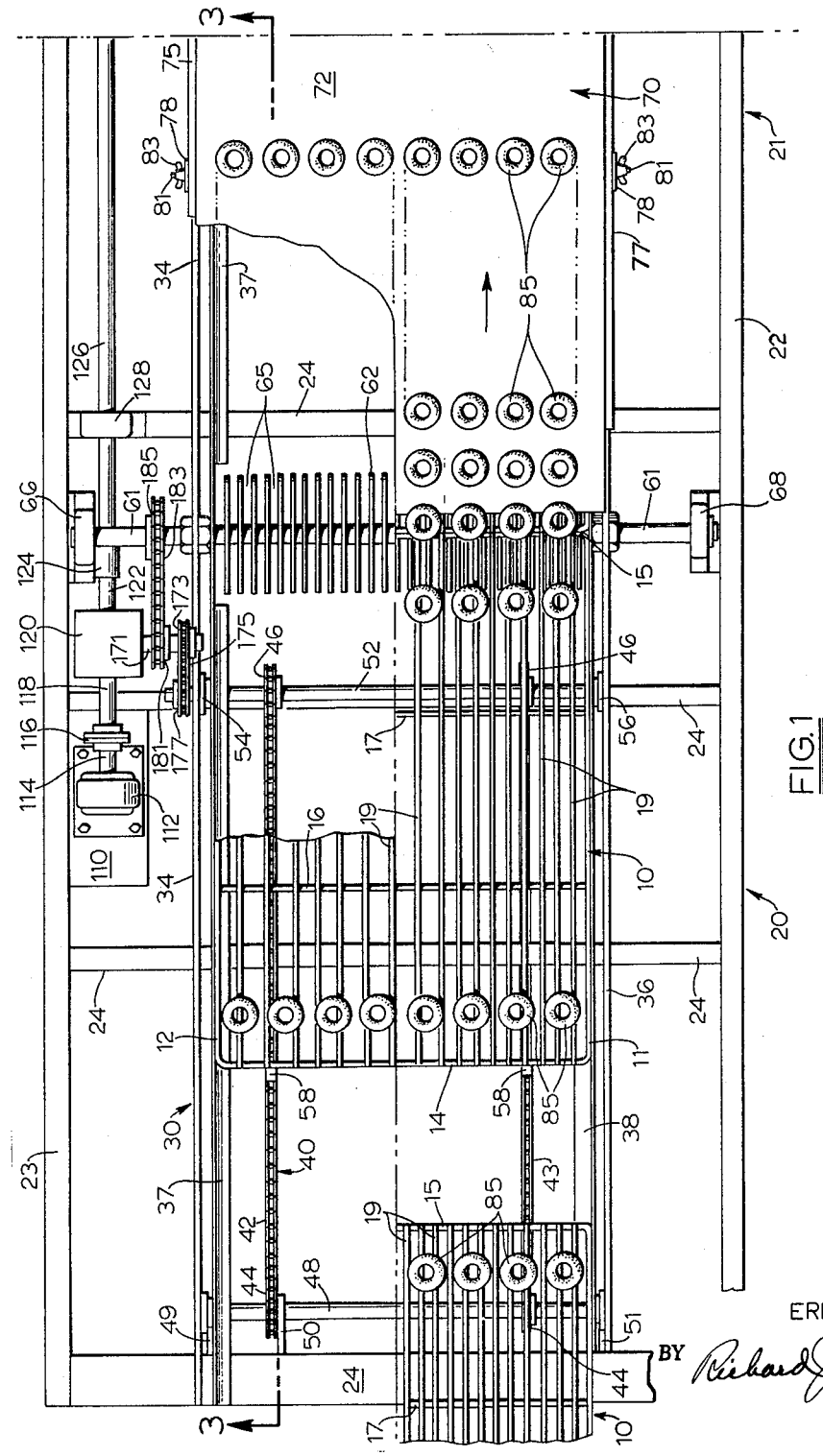
FIGURE 1 is a fragmentary top plan view of the receiving end of an apparatus embodying the principles of the invention, wherein only part of each bakery screen is shown in order to better illustrate the detailed features of the operating parts thereof.
Figure 2:
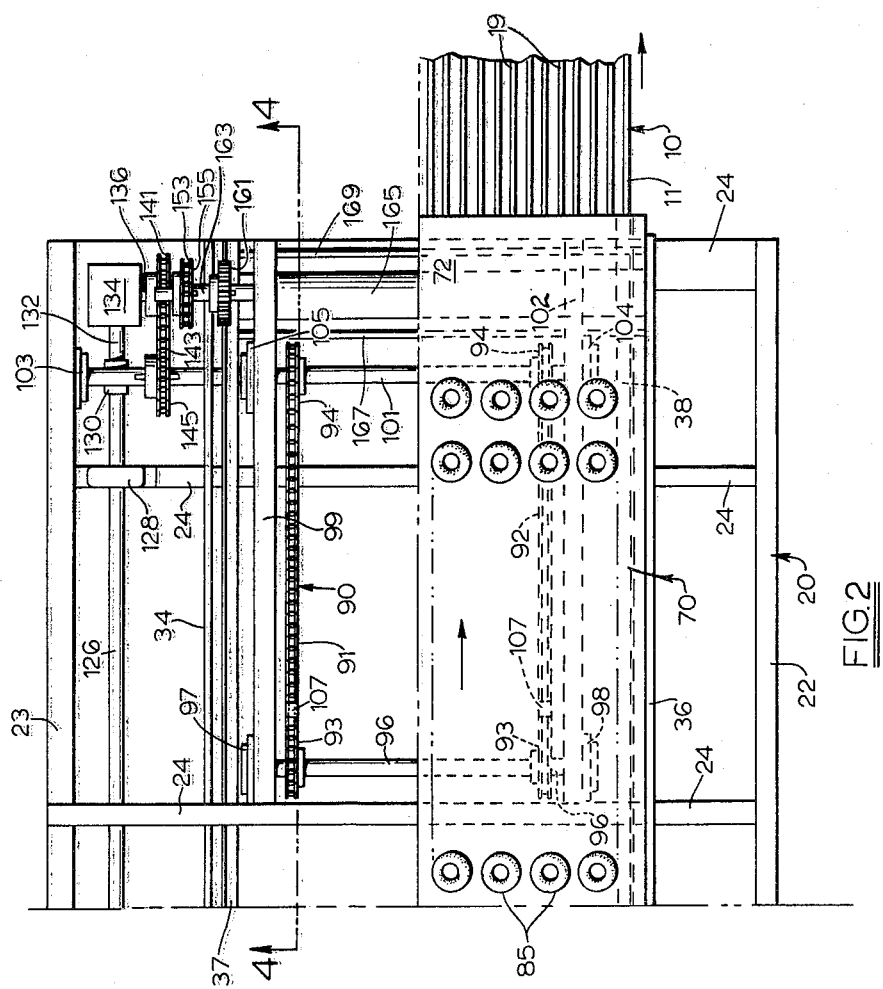
FIGURE 2 is a fragmentary top plan view of the delivery end of the apparatus shown in FIGURE 1, the same being a continuation thereof, wherein only part of an empty bakery screen is shown in order to better illustrate the detailed features of the operating parts thereof.
Figure 3:
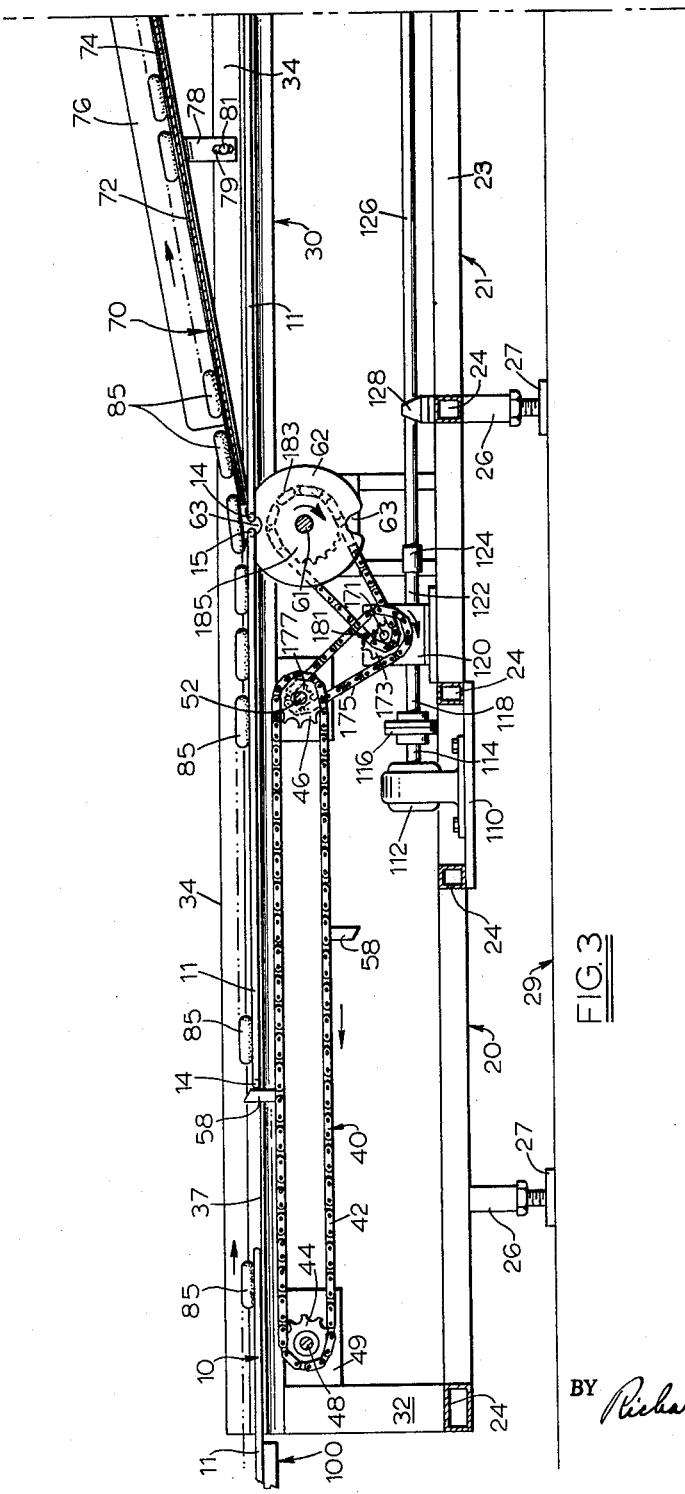
Figure 4:
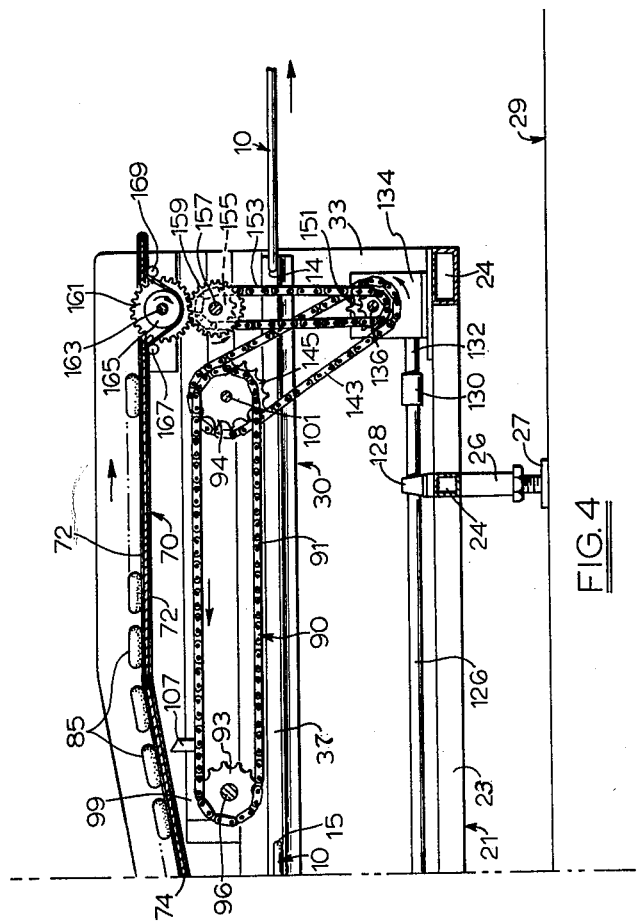

FIGURE 3 is a fragmentary longitudinal sectional view of that part of the apparatus shown in FIGURE 1, the same having been taken substantially along the line 3—3 thereof, looking in the direction of the arrows; and FIGURE 4 is a fragmentary longitudinal sectional view of that part of the apparatus shown in FIGURE 2, the same having been taken substantially along the line 4—4 thereof, looking in the direction of the arrows.

Referring now to the drawings, there is shown in FIGURE 1, a conventional wire bakery screen 10. Such screens are generally rectangular in shape, and have a heavy outer wire frame consisting of spaced longitudinally extending sides 11 and 12 and transversely extending ends 14 and 15. Each screen 10 is reinforced between its ends by a series of longitudinally spaced transversely extending rungs 16 and 17, which are also made of wire of generally the same size and weight as the main frame structure. A conventional wire screen 10 may have three, four or even five transversely extending rungs, depending upon its length. In the present instance, each wire screen has four runs 14, 16, 17 and 15, which are substantially equally spaced longitudinally and extend transversely of the main frame structure. Each wire screen 10 also has a series of longitudinally extending and transversely spaced supporting wires 19, which are welded, soldered or otherwise securely fastened to one side of each of said rungs. The wire bakery screen 10 has a flat supporting surface with spaces between its adjacent wires and rungs through which cool and/or hot air may readily circulate in and around the articles positioned thereon as may be required.

Referring again to FIGURES 1 and 3, there is shown an article transfer machine 20, comprising a suitable lower supporting main frame structure 21, consisting of a pair of transversely spaced and longitudinally extending tubular side members 22 and 23 and a series of transversely extending and longitudinally spaced tubular reinforcing cross-members 24. The lower main frame structure 21 is provided with a series of conventional legs 26, having adjustable foot pads 27 that engage the floor 29.

An upper rectangular main frame structure 30 is mounted in spaced vertical relation above the lower main frame structure 21 on suitable tubular end columns 32 and 33. The upper main frame structure 30 has a pair of transversely spaced longitudinally extending members 34 and 36, which serve as supports for the supporting brackets and bearings of the several transversely extending shafts hereinafter to be described in detail. The upper frame structure 30 has mounted within and parallel to the members 34 and 36 a pair of spaced angle iron supporting rails 37 and 38, providing a suitable trackway upon which the bakery screens 10 may be moved by sliding longitudinally therealong.

There is mounted on the incoming or receiving end of the upper frame structure 30 an indexing conveyor 40, which consists of a pair of transversely spaced chains 42 and 43 mounted over pairs of spaced sprocket wheels 44 and 46. The sprocket wheels 44 are mounted fixedly on a shaft 48 journalled in suitable bearing brackets 49, 50 and 51. The sprocket wheels 46 are keyed to a shaft 52, which is suitably journalled in spaced bearing brackets 54 and 56. Each of the chains 42 and 43 of the indexing conveyor 40 is provided with a pair of longitudinally and oppositely spaced indexing fingers 58. The upper indexing fingers 58 project upwardly between the trackway rails 37 and 38 a distance sufficient to engage the rear rung 14 of the bakery screen 10 being moved therealong.

Intermediate the ends of the upper frame structure 30, there is mounted transversely thereof on a shaft 61 a large diameter slotted and grooved wheel 62, whose upper peripheral edge projects above the horizontal plane of the rails 37 and 38. The wheel 62 is provided with diammetrically spaced peripheral grooves 63, which extend longitudinally thereof. The grooves 63 are open at the outer periphery of the wheel 62 and are of a size and shape capable of receiving two rungs 14 and 15 of adjacent bakery screens 10, as best shown in FIGURE 3. The wheel 62 is also provided with a series of transversely spaced circumferentially extending radial slots 65, which serve as passageways for the longitudinally extending supporting wires 19 of the screens 10. Obviously, one slot 65 must be provided for every longitudinally extending wire 19 contained in the bakery screens 10. The ends of the shaft 61, which drives the wheel 62 are journalled in suitable supporting bearing brackets 66 and 68 of conventional construction.

A delivery conveyor 70 is mounted above the upper frame structure 30, and consists of a sanitary belt 72 operating over a metal supporting plate 74, whose ends are rounded to provide a smooth and uninterrupted surface. It will be noted that the upper frame structure 30, which supports the delivery conveyor 70, is provided with a pair of transversely spaced flanged side plates 75 and 77 which, in turn, are provided each with an adjustable supporting leg 78. Each of the legs 78 has a vertically extending slot 79. A threaded stud bolt 81 secured to each of the members 34 and 36 projects through the slot 79. Conventional wing nuts 83 are used to frictionally secure the legs 78 in the vertical position desired. In this manner, the receiving end of the delivery conveyor 70 may be adjustably juxtapositioned with respect to the upper peripheral surface of the wheel 62 to receive the articles, which are illustrated in the drawings as doughnuts 85, being removed from the bakery screens 10, carried over by the periphery of the said wheel 62 and deposited onto the receiving end of the delivery conveyor 70. An adjustment is desirable when the size and shape of the articles 85 being removed are changed substantially.

Referring now to FIGURES 2 and 4, there is mounted between the spaced rails 37 and 38 immediately below the delivery belt conveyor 70 a second indexing conveyor 90, which consists of a pair of spaced chains 91 and 92 entrained over spaced sprocket wheels 93 and 94. The sprocket wheels 93 are mounted fixedly on a shaft 96, which has its ends suitably supported in spaced bearing brackets 97 and 98. The sprocket wheels 94 are keyed to the shaft 101, which is suitably journalled in spaced conventional bearing brackets 103, 104 and 105. The brackets 97 and 105 are mounted on a longitudinal supporting rail 99, and the brackets 98 and 104 are mounted on a corresponding rail member 102. The members 99 and 102 are secured at their ends to the transversely extending supporting members 24. This second indexing conveyor 90 extends in spaced parallel relation above the track rails 37 and 38, and each chain 91 and 92 has a single outwardly projecting finger 107 spaced oppositely to one another. The fingers 107 are shown projecting upwardly on their return flight, but are of sufficient length when projecting downwardly on its forward flight to engage the front rung 15 of the empty bakery screen 10 adjacent opposite ends to move it forwardly and away from the wheel 62.

*The Driving Mechanism*

Referring again to FIGURE 3, there is shown the details of the mechanism which operates or drives the several conveyors 40, 90 and 70 and the slotted and grooved wheel 62.

Mounted on a suitable supporting platform 110, which in turn is suspended in any conventional manner from the lower main frame structure 21, is an electric motor 112, whose driving shaft 114 is connected through a conventional flange coupling assembly 116 to a drive shaft 118 of a conventional reduction gear unit 120. The reduction gear unit 120 has a driven shaft 122, which, in turn, is connected through a sleeve coupling 124 to an elongated drive shaft 126. The elongated drive shaft 126 is suitably supported in pillow blocks 128, which extend upwardly from the tops of the legs 26. Referring to FIGURE 4, the forward or opposite end of the drive shaft 126 is connected through a sleeve coupling 130 to a shaft 132, which, in turn, is the driven shaft of a gear reduction unit 134. The gear reduction unit 134 has a drive shaft 136, which extends transversely of the machine 20 and has its opposite end journalled in a suitable bearing bracket (not shown) mounted on the main lower frame structure 21.

The drive shaft 136 has a sprocket wheel 141 keyed thereto, which drives a chain 143, whose opposite end is entrained over a sprocket wheel 145, which is keyed to the shaft 101. This arrangement drives the second indexing conveyor 90.

The drive shaft 136 also has a second sprocket wheel 151 keyed thereto, which drives a vertically extending chain 153 that has its opposite or top end entrained over a sprocket wheel 155, which, in turn is keyed to a shaft 157. The shaft 157 has a gear 159 keyed thereto, which enmeshes with a gear 161 keyed to a shaft 163. The shaft 163 has a roller 165 keyed thereto, which serves as a drive for the belt 72 of the delivery conveyor 70. The belt 72 has spaced rollers 167 and 169 mounted adjacent the opposite sides of the driving roller 165, which are adjustably mounted in any suitable manner. These two adjustable rollers 167 and 169 permit slack in the conveyor belt 72 to be taken up or its tautness adjusted without disassembling the same.

Referring again to FIGURES 1 and 3, the reduction gear unit 120 has a second driven shaft 171, which has a sprocket wheel 173 keyed thereto. The sprocket wheel 173 drives a chain 175 which, in turn, drives a sprocket wheel 177, which is keyed to the shaft 52. Since the spaced sprocket wheels 46 are keyed to the shaft 52, this arrangement serves to drive the first indexing conveyor 40.

The second driven shaft 171 of the reduction gear unit 120 also a second sprocket wheel 181 keyed thereto, which drives a chain 183, whose opposite end drives a sprocket wheel 185 keyed to the shaft 61. Since the sprocket wheel 185 is keyed to the shaft 61, this arrangement serves to drive the slotted and grooved wheel 62.

*The Operation of the Machine*

In describing the operation of the machine, it will be assumed that the motor 112 is running and all conveyors operating. All of the conveyors 40, 70 and 90, including the slotted and grooved wheel 62, operate continuously and synchronously when the motor 112 is running.

The loaded wire bakery screens 10 are delivered intermittently by a screen feeding conveyor 100 onto the supporting rails or trackways 37 and 38. Usually, the loaded screens 10 are delivered intermittently in an endless line, and each screen 10 is pushed forwardly by the following screen in the line. Obviously, the loaded screens 10 may be fed by hand into the apparatus 20, if desired, since the feeding does not control their movement through the apparatus 20.

The loaded bakery screens 10 are fed forwardly onto the trackways 37 and 38, either by the screen feeding conveyor 100 or by hand, far enough to permit the lower pair of indexing fingers 58 of the conveyor 40 to engage its rear rung 14 as they reverse their direction of flight while riding around the sprocket wheels 44. These indexing fingers 58 will move the screen 10 forwardly until its first or forward rung 15 is received into one of the peripheral grooves of the wheel 62 and the longitudinally extending wires 19 will at the same time be moved into the radial slots 65 thereof.

In each operating cycle of the indexing conveyor 40, a screen 10 is moved a distance equal to its own length.

which, in the illustration shown is the distance of its four rungs 14, 16, 17 and 15. Therefore, as a screen 10 is moved through the slotted wheel 62, its two spaced grooves 63 must receive each of its four rungs 15, 17 16 and 14 in that order. Since the grooves 63 are one hundred and eighty degrees apart, the slotted wheel 62 must revolve twice for each movement of the indexing conveyor 40 the distance of a screen 10. Obviously, at the start of the operation there must be a screen 10 idling in the slotted wheel 62, which does not at any time control the movement of the screens. During such idling periods, the grooves 63 will move under the rungs of the screen 10 without moving said screen forwardly. As the next succeeding screen 10 advances, its front rung 15 contacts the rear rung 14 of the screen idling in the slotted wheel 62 and pushes it through and beyond said wheel 62. As the last rung 14 of the first screen and the first rung 15 of the second screen approaches the center line of the slotted wheel 62, one of the grooves 63 of said wheel 62 will move into position to receive both rungs, as best shown in FIGURE 3. This is the only time in each cycle that there are two rungs 14 and 15 of adjacent screens in one groove 63.

As the screens 10 keep advancing, the forward screen is pushed out of, beyond and forwardly of the wheel 62, whereupon, the second and third rungs, 17 and 16, respectively, are each received by one of the grooves 63. As the third rung 16 leaves the wheel 62, the screen 10 is moved beyond the indexing finger 58 of the first indexing conveyor 40 and comes to its idling position, which completes its cycle.

When the idling screen is moved forwardly and entirely beyond the wheel 62, the indexing fingers 107 of the second indexing conveyor 90 will engage its forward rung 15 and pull it forwardly. The second indexing conveyor 90, being operated at a faster rate of speed than the initial indexing conveyor 40, makes room for the following screen 10 to be moved into its idling position without having to push its forward screen forwardly. In this manner, the empty screens 10 are moved out of the apparatus 20 for reloading.

*Removal of the Articles*

In the operation of the apparatus, it will be noted that the peripheral edges of the slotted wheel 62 project through and above the tops of the wires 19 of the bakery screen 10 so that the articles 85 carried thereby will ride up on the peripheral surface of said wheel. As the articles 85 are moved over the curved peripheral surface of the wheel 62, they are carried forwardly and deposited onto the juxtaposed top surface of the sanitary conveyor belt 72 of the delivery conveyor 70, whereupon they are carried away to the following operation, which may be coating, sugaring and/or packaging. While the articles 85 are being removed from the bakery screen 10 and carried upwardly by the peripheral surface of the slotted wheel 62, it will be noted that the wire-mesh screen 10 remains in its original horizontal plane, passing directly through the grooves 63 and slots 65 of the wheel 62.

Obviously, the principle of operation can be applied to empty bakery screens of any size or shape. They may have any number of spaced rungs or any number of transversely spaced longitudinal wires. The only requirement is that the slotted wheel 62 be designed to provide a radial slot for each longitudinal wire, and, either the number of peripheral grooves can be increased or decreased or the timing of the several units changed to meet the conditions involved when using a different size bakery screen.

Although I have only described in detail but one form which the invention may assume, it will be readily apparent to those skilled in the art that the invention is not to be so limited, but that various other and further modifications may be made therein without departing from the spirit thereof.

What I claim is:

1. Apparatus for removing articles supported on wire bakery screens, said screens each having a series of longitudinally extending transversely spaced wires and a plurality of transversely extending longitudinally spaced rungs, which comprises, in combination, a trackway over which said bakery screens may be moved, a slotted and grooved wheel mounted within said trackway with its peripheral edge projecting thereabove, said wheel having a series of radial slots spaced to correspond to the spacing of the longitudinal wires of said bakery screen, said wheel having a plurality of circumferentially spaced peripheral grooves for receiving the transversely extending rungs of said bakery screen, an indexing conveyor for moving said screens along said trackway in timed sequence with the rotation of said wheel so that the rungs of said bakery screen will enter said peripheral grooves while its longitudinal wires will enter said radial slots, whereupon the articles supported by said screen will ride up and over the peripheral surface of said wheel projecting above said trackway and through said bakery screen and be deposited onto a delivery conveyor, said bakery screen passing through said wheel while remaining on said trackway, a second indexing conveyor for engaging said bakery screen passing through said wheel to remove it therefrom, and means for operating said indexing conveyors and said slotted wheel synchronously.

2. Apparatus for removing articles supported on wire bakery screens, said screens each having a series of longitudinally extending transversely spaced wires and a plurality of transversely extending longitudinally spaced rungs, which comprises, in combination, a trackway over which said bakery screens may be moved, a slotted and grooved wheel mounted within said trackway with its peripheral edge projecting thereabove, said wheel having a series of radial slots spaced to correspond to the spacing of the longitudinal wires of said bakery screen, said wheel having a plurality of circumferentially spaced peripheral grooves for receiving the transversely extending rungs of said bakery screen, an indexing conveyor for moving said screens along said trackway in timed sequence with the rotation of said wheel so that the front rung of said bakery screen will enter one of said peripheral grooves while its longitudinal wires will enter said radial slots, said indexing conveyor now advancing said next succeeding screen whose front rung will engage the rear rung of the screen idling in said wheel and push it therethrough, whereupon the articles supported by said screen will ride up and over the peripheral surface of said wheel projecting above said trackway and be deposited onto a delivery conveyor, said bakery screen remaining on said trackway while being pushed through said wheel, a second indexing conveyor for removing said screen after it has passed through said wheel for reloading, and means for operating said first indexing conveyor and said wheel in timed sequence so that each transversely extending rung of each screen will enter a peripheral groove in said wheel as it passes therethrough.

References Cited in the file of this patent

UNITED STATES PATENTS

| 2,888,126 | Leaman et al. | May 26, 1959 |
| 2,897,772 | Hunter | Aug. 4, 1959 |

FOREIGN PATENTS

| 110,342 | Australia | Apr. 18, 1940 |
| 908,962 | Germany | Apr. 12, 1954 |